Aug. 13, 1957 D. L. WAUGH 2,802,511
FLEXIBLE CONVEYOR AND POWER TRANSMISSION BELT
Filed Dec. 3, 1952

INVENTOR.
DALE L. WAUGH
BY
ATT'Y.

United States Patent Office 2,802,511
Patented Aug. 13, 1957

2,802,511

FLEXIBLE CONVEYOR AND POWER TRANSMISSION BELT

Dale L. Waugh, Dayton, Ohio, assignor to The Dayton Rubber Company, a corporation of Ohio Application December 3, 1952, Serial No. 323,781

4 Claims. (Cl. 154—4)

My invention relates to flexible belts, and more particularly to conveyor and power transmission belts designed to operate in conjunction with multiple groove pulleys. My belt is especially adapted for use in a grinding or polishing mechanism wherein the outer surface of the belt carries an abrasive or buffing element which, while the belt is being driven about a series of multi-groove pulleys, is brought into sliding contact with the surface to be ground or polished. As can be readily perceived, when a force is applied inwardly to the outer surface of the belt at a point between any two pulleys, the belt will exert a perpendicularly outward counter force, the magnitude of which will vary according to the distance between pulley centers and the tautness of the belt. This perpendicular resiliency imparted to the belt-carried abrasive or buffer makes this type of mechanism well suited for the finishing of arcuate surfaces such as are found in automobile bodies.

In the particular adaptation of my invention just described, the belt operates as a conveyor insofar as it carries the abrasive or buffing element; and it operates as a power transmission belt in that it transmits the power from the driving pulley with which it is in combination to impart a sliding force to the abrasive or buffing material. I do not, however, limit my invention to its use in such a combination; for the improvements to be described below find their utility in any type of power transmission and/or conveyor belt drive. In a conveyor belt system it is often desirable to employ a wide belt of the order of 12 in. or more so as to provide a larger carrying or conveying surface. When such a wide belt is used, however, a slight angularity of the rotational axes of the sheaves on which the belt is riding will cause considerable internal stresses within the belt and the belt will tend to track off of the sheaves. In belt power transmission drives, on the other hand, it is often desirable to use a wide belt so that the power to be transmitted will be distributed over a sufficiently large belt area, and each strength member will have sufficient strength to carry its part of the load.

The problems arising from the use of a wide belt on power transmission drives are many. While increasing the width of such a belt can give sufficient cross-sectional area for distribution of the load, so doing increases the weight without proportionately increasing the driving surface. It often happens that after the belt width has been increased to accommodate the load, the belt must be further enlarged to provide sufficient contact for the driving surface. As in the case of conveyor belts, wide power transmission belts riding on sheaves in nominally unparallel rotation develop internal stresses resulting in uneven wear, heat formation and premature failure.

To meet these problems, sheaves or pulleys with a series of laterally spaced peripheral grooves have been designed for use in conjunction with a series of narrower belts of conventional cross sections in such a manner that the individual belts share in carrying the load of a given power system. While such multiple belt drives tend to solve many of the problems arising in the use of wide belts, the use of several belts to transmit increments of power from the same source has given rise to new difficulties.

Where more than one belt is used on the same pulley, it is apparent that unless all of the belts are exactly uniform in length, density, flexibility, and other basic physical properties, the load will be unevenly distributed. While uneven load distribution will not cause critical internal stresses in the smaller belts as it does in the above-mentioned wide belts, it will result in a transfer of the load to less than all of the belts causing certain of them, at least, to be overloaded and to fail prematurely. Whipping and twisting of the individual belts on a multiple belt drive may also result from uneven load distribution.

To remedy these problems arising from the use of multiple belt drives, various means have been devised for connecting the series of belts to be used over the same pulley with a web or other transverse reinforcement secured to the outer surfaces of the individual belts. While such combinations are sometimes spoken of as integrated, all of those with which I am familiar comprise a series of driving ribs which are built up in the conventional manner for single belts and are then fixed in lateral relationship by a peripheral transverse band. It is true that the ribs may be vulcanized to the band and that the ribs and the band may have common laminations, but in theory and in operation, the relationship and function of band and ribs, in even these integrated forms, remain separate and distinct. While the ribs transmit the power, the band acts as a connector.

In the types of multi-groove pulley belts heretofore known to the art, no provision has been made for gaining the desired uniformity of length, thickness, flexibility, and other physical characteristics necessary for uniform load distribution among the various ribs. Length variations have been recognized and compensated for by making the band of an extensible material so that it may be readily deformed to allow the shorter of the ribs attached to it to freely engage the pulley. While such an arrangement prevents whipping and twisting of the ribs, it does not avoid unequal distribution of the load, for the shortest of the ribs will be free to engage the pulley surfaces more firmly than the remainder of the belts on the drive and will carry more than its share of the load as if it were part of a multi-groove drive involving separate belts. Even should a more rigid band be employed, driving ribs of unequal length would tend to engage the pulley grooves with unequal force thereby setting up longitudinal shearing stress within the band portion. In addition to contributing to premature failure of the band, the deformation of the band causes the ribs to bear unevenly on the driving surfaces so that uneven wear on the ribs also results.

It is an object of this invention to provide a belt for satisfactory operation in combination with multi-grooved pulleys.

It is also an object of this invention to provide a belt the inner surface of which has a plurality of laterally spaced longitudinal beads or ribs for driving engagement with the annular recesses of a multi-groove pulley.

It is a further object of this invention to provide an integral belt construction consisting of an inner compression section, an intermediate neutral axis section, and an outer tension section, the inner surface of which is longitudinally grooved for driving engagement with a multi-groove pulley.

It is a further important object of this invention to provide a method of making belts of the type herein disclosed.

Further objects and advantages within the scope and comprehension of my invention will be apparent from the following description and reference to the annexed drawings in which like symbols designate like parts.

Figure 1:
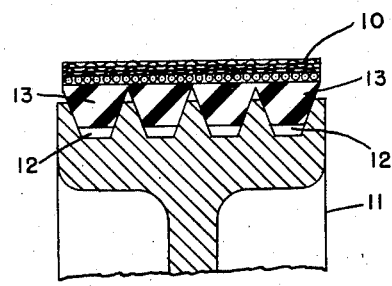
Figure 1 is a vertical cross section through a multi-groove pulley and a belt embodying the principles of my invention, showing the manner of operative engagement therebetween.

As shown in Figure 1, a belt 10 embodying the principles of my invention has laterally spaced ribs 13 passing longitudinally about its inner circumference. When such a belt 10 is used with a multi-groove pulley 11, the driving surfaces of the ribs 13 interdentally engage the driving surfaces of their respective pulley grooves 12.

Figure 2:
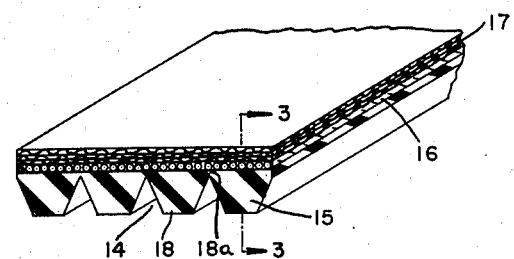
Figure 2 is a perspective view in cross section showing the composition of a preferred embodiment of my invention.
Figure 3:
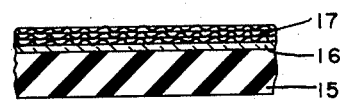
Figure 3 is a vertical section through line 3—3 of Figure 2 as viewed in the direction of the arrow.

As best shown in Figures 2 and 3, a typical embodiment of my invention is composed of a compression section 15 of standard compression stock, such as gum or fiber-reinforced rubber, a neutral axis section longitudinally reinforced with one or more layers of axially aligned convolutions of continuously wound cord 16, and a tension section 17 of a plurality of layers of rubberized fabric. The cord 16 may be of cotton, nylon, rayon, wire or any suitable material depending upon tensile strength and elongation requirements. The fabric layers of the tension section 17 may be rubber coated on one or both sides and may be either straight or bias cut. The term "rubber" refers to natural and synthetic rubber or rubber compounds such as normally used in the V-belt art. The synthetic rubbers may include such materials as butadiene-styrene copolymers, butadiene-acrylic nitrile copolymers, polychloroprenes, or blends of these materials with each other or with natural rubber.

It will be noted that the belt thus far described is composed of the conventional compression, neutral axis and tension sections. The width of my belt corresponds to the overall width of the multi-groove pulley with which it is to be used, and at spaced intervals across this width are provided longitudinal ribs separated by grooves 14, for driving engagement with a multi-groove pulley as shown in Figure 1.

It will be observed that the grooves 14 are cut entirely from the compression section 15 so that the depending ribs 18 are joined transversely by the continuous layer of compression stock immediately below the neutral axis cord as shown at 18a. This feature of my invention which is in keeping with my general idea of integrating the function of all the parts of my belt is made possible by the fact that the plurality of driving ribs will provide a sufficient driving surface without necessitating excessive groove depth such as would entail cutting into the neutral axis section 16.

Figure 4:
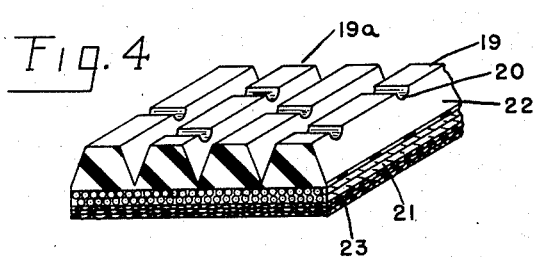
Figure 4 is a perspective view in partial section of a slight modification of the belt shown in Figures 2 and 3, the same being shown in inverted position.

In Figure 4 is shown a modification of the belt of my invention wherein the inner surface of the ribs 19 and 19a is provided with transverse notches or grooves 20 formed in the bases of the compression sections to enhance the flexibility of the belt for use around pulleys of small diameter. It may be found desirable to arrange the transverse grooves 20 so that they alternate from rib to rib in a staggered manner. For example, the transverse grooves of the rib 19 might lie opposite the space between the transverse grooves of the rib 19a. This arrangement of lateral grooves allows easy flexing of the belt and, at the same time, provides a greater area of contact between belt and pulley at any given instant than would be provided if the grooves 20 all lay in transverse alignment. The neutral axis section 21 of the belt shown in Figure 4 is composed of two layers of neutral axis cords, while the compression section 22 and tension section 23 are formed as above described.

Figure 5:
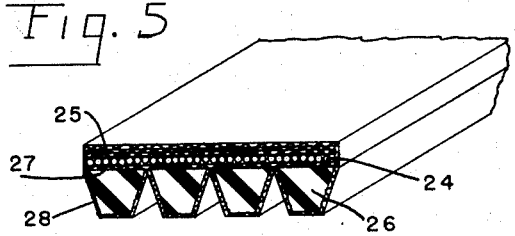
Figure 5 is a vertical section through a perspective of another form of belt embodying the principles of my invention.

The form of this invention shown in Figure 5 has a neutral axis section 24 and tension section 25 similar to the corresponding sections of the above-described embodiments. In the present construction, however, the rubber-like compression section 26 has a layer of rubberized fabric 27 in its upper continuous portion underlying the neutral axis section 24. In applications calling for relatively deeper grooves, this fabric layer forming the continuous portion of the compression section provides a readily discernable limit for the groove depth and provides the strength necessary to maintain the longitudinal ribs in proper alignment. Where the longitudinal grooves are of such depth as to completely separate the ribs in the compression section, the fabric portion 27 preserves the desired continuity to underlie the neutral axis 24. It will be observed that, while the belts previously described with reference to Figures 1, 2, 3, and 4 have been of the raw edge type, the modification of Figure 5 has a cover or wrapper 28 of bias-cut rubberized fabric such as is commonly used for wrapped or covered belts.

Figure 6:
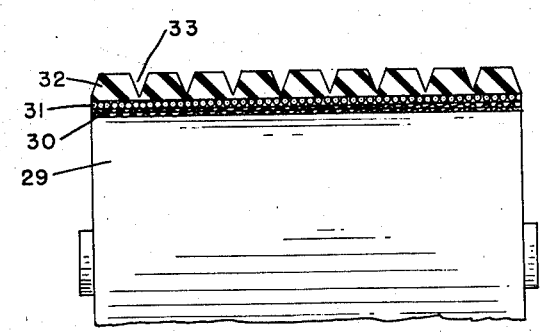
Figure 6 is a fragmentary elevational view illustrating the novel method of building belts of my invention wherein the belt sleeve is shown in vertical section.

Referring now to Figure 6 and to the manufacture of the belts described, I have found it desirable to place about the surface of a suitable mandrel 29 the layers of rubberized fabric to form the tension section 30. These layers may be separately applied to the mandrel or a single sheet of fabric may be wound about the mandrel until the desired number of plies is reached.

About the tension section thus formed is wound the neutral axis cord 31. As explained, this cord may be laid in one or more layers. It may be wound continuously to form an unbroken chain of concentric helices or it may be broken so that the convolutions are grouped according to the number of belts to be cut from the sleeve thus formed.

The compression stock 32 is then placed about the neutral axis cord. If transverse grooves are desired in the compression section, they may be formed by impressing a toothed matrix into the compression stock and allowing the teeth of said matrix to remain in registration with the grooves of said compression section until after vulcanization of the belt sleeve. It can thus be seen that the belt here is built in a manner inverse to the conventional drum-built belt.

The mandrel and belt sleeve built up in the described manner, are then subjected to heat and pressure so as to vulcanize the belt sleeve. The hardened sleeve while still on the mandrel may then be placed in a lathe or other suitable cutting device for the formation of the longitudinal ribs by circumferentially serrating the outer surface of the sleeve to provide grooves or serrations 33 in the compression section 32 about said outer sleeve surface.

Finally, the belts are cut to width and turned inside out so as to properly arrange the compression, neutral axis and tension sections, with the compression section forming the bottom of the belt.

From the foregoing, it can be seen that the belt of my invention does not rely on a series of separate belt-type ribs joined by a web or band. Rather, the ribs are an integral part of the belt. In a belt of this type all of the ribs have the same neutral axis and tension section reinforcements and the ribs are formed from the same sheet of material. There is accordingly, substantial uniformity in the length, flexibility, thickness, etc. of the rib portions. On the other hand, the provision of the longitudinal ribs increases the available driving surface for a belt of given width and so distributes the load as to allow even wear and longer life.

The belt of my invention is particularly adapted for use in the abrasive mechanism previously described in that the common tension, neutral axis and compression sections reinforce the outer surface of the belt against perpendicular displacement thereby allowing a uniformly firm contact between the belt carried abrasive and the work surface.

It is to be understood that the forms of my invention herewith shown and described, are to be taken as preferred examples of the same, and that various changes in shape, size, arrangement of parts and steps of manufacture may be resorted to, without departing from the spirit of my invention or the scope of the subjoined claims.

I claim:

1. A method for the manufacture of multiple groove pulley belts by building the same in an inverted manner which comprises building a rubber and fabric belt sleeve about a suitable mandrel with the compression section on the outside of said sleeve, vulcanizing said sleeve, serrating the outer surface of said compression section to form circumferential grooves of a depth less than the thickness of said compression section, cutting individual belts each having a plurality of serrations from the vulcanized and serrated compression section, and turning the belts thus formed inside out so that the serrated compression section is on the inner surface.

2. A method for the manufacture of multiple groove pulley belts comprising winding at least one ply of rubberized tension section fabric about a suitable mandrel, helically winding circumferentially thereon a continuous inextensible cord, winding thereon a layer of rubber compression stock, vulcanizing the sleeve of rubber and fabric material thus formed, serrating the exposed surface of said compression stock to form longitudinal grooves of a depth less than the thickness of the layer of said compression stock, cutting individual belts from the vulcanized and serrated compression stock, each of said belts having a plurality of serrations, and turning the belts inside out so that the serrated compression stock is on the inner belt surface.

3. A method for the manufacture of multiple groove pulley belting comprising winding at least one ply of rubberized fabric about a suitable mandrel, helically winding circumferentially thereon a plurality of axially aligned inextensible cord convolutions, winding thereon a second fabric portion consisting of at least one fabric layer, winding upon this second fabric portion a layer of rubber compression stock, vulcanizing the sleeve of rubber and fabric material thus formed, serrating the exposed surface of said compression stock to form longitudinal grooves thereon, cutting individual belts from the vulcanized and serrated stock, each of said belts having a plurality of serrations, and turning the belts inside out so that the serrated compression stock is on the inner surface of the belt.

4. A method for the manufacture of multiple groove pulley belts by building the same in an inverted manner which comprises building a belt sleeve with a rubber-containing compression section on the outside of said sleeve, forming circumferential grooves opening on the outer surface of said compression section and having a depth less than the thickness of said compression section, vulcanizing said sleeve, cutting individual belts each having a plurality of grooves from the vulcanized and grooved compression section, and turning the belts thus formed inside out so that the grooved compression section is on the inner surface.

References Cited in the file of this patent

UNITED STATES PATENTS

| | | |
|---|---|---|
| Re. 21,075 | Freedlander | May 9, 1939 |
| 1,729,329 | Chilton | Sept. 24, 1929 |
| 1,777,864 | Short | Oct. 7, 1930 |
| 2,016,140 | Freedlander | Oct. 1, 1935 |
| 2,298,867 | Case | Oct. 13, 1942 |
| 2,337,985 | Freedlander | Dec. 28, 1943 |
| 2,414,822 | Lindsay et al. | Jan. 28, 1947 |
| 2,442,037 | Carter et al. | May 25, 1948 |
| 2,514,429 | Waugh | July 11, 1950 |
| 2,620,016 | Adams | Dec. 2, 1952 |